(12) United States Patent
Chen et al.

(10) Patent No.: US 10,364,130 B2
(45) Date of Patent: Jul. 30, 2019

(54) SPEED DETECTION SYSTEM OF PASSENGER CONVEYOR AND SPEED DETECTION METHOD THEREOF

(71) Applicant: Otis Elevator Company, Farmington, CT (US)

(72) Inventors: Yanying Chen, Guangzhou (CN); ZhaoXia Hu, Hangzhou (CN); Hui Fang, Shanghai (CN); Zhen Jia, Shanghai (CN); Jianwei Zhao, Shanghai (CN); Qiang Li, Shanghai (CN); Anna Su, Shanghai (CN); Alan Matthew Finn, Hebron, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 172 days.

(21) Appl. No.: 15/663,420

(22) Filed: Jul. 28, 2017

(65) Prior Publication Data
US 2018/0029839 A1 Feb. 1, 2018

(30) Foreign Application Priority Data
Jul. 29, 2016 (CN) .......................... 2016 1 0613014

(51) Int. Cl.
*B66B 29/00* (2006.01)
*G06T 7/55* (2017.01)
(Continued)

(52) U.S. Cl.
CPC .......... *B66B 29/005* (2013.01); *B66B 25/006* (2013.01); *G01B 21/18* (2013.01);
(Continued)

(58) Field of Classification Search
CPC ..... B66B 25/006; B66B 29/005; G01B 21/18; G01P 3/38; G06T 7/174; G06T 7/194;
(Continued)

(56) References Cited

U.S. PATENT DOCUMENTS

| 6,112,166 A | 8/2000 | Joosten |
| 2002/0113877 A1 | 8/2002 | Welch |
| 2006/0232789 A1 | 10/2006 | Oh et al. |
| 2007/0220329 A1 | 9/2007 | Steindl et al. |
| 2012/0043180 A1* | 2/2012 | Braasch ................. B66B 29/005 198/322 |

(Continued)

FOREIGN PATENT DOCUMENTS

| CN | 2929690 Y | 8/2007 |
| CN | 102602758 A | 7/2012 |

(Continued)

OTHER PUBLICATIONS

Physical Measurement Technologies, Inc., [online]; [retrieved on Jul. 26, 2017]; retrieved from the Internet http://www.pmtvib.com/index.php?option=com_content&task=view&id=16&,Itemid=39 PMTvib.com, "EVA Vibration Analysis Tools Software," Physical Measurement Technologies, Inc., 2017, pp. 1-3.

*Primary Examiner* — Mekonen T Bekele
(74) *Attorney, Agent, or Firm* — Cantor Colburn LLP

(57) ABSTRACT

The present invention relates to the field of passenger conveyor technologies, and provides a speed detection system of a passenger conveyor and a speed detection method thereof. In the speed detection system and the speed detection method of the present invention, an imaging sensor and/or a depth sensing sensor are/is used to sense at least one part of the passenger conveyor to acquire sequence frames, and the sequence frames are analyzed by a processing apparatus to obtain at least speed information about steps of the passenger conveyor.

29 Claims, 6 Drawing Sheets

(51) Int. Cl.
*G06T 7/194* (2017.01)
*G06T 7/174* (2017.01)
*G06T 7/246* (2017.01)
*G01B 21/18* (2006.01)
*G01P 3/38* (2006.01)
*B66B 25/00* (2006.01)

(52) U.S. Cl.
CPC ............ *G01P 3/38* (2013.01); *G06T 7/174* (2017.01); *G06T 7/194* (2017.01); *G06T 7/248* (2017.01); *G06T 7/55* (2017.01); *G06T 2207/10016* (2013.01); *G06T 2207/10024* (2013.01); *G06T 2207/10028* (2013.01)

(58) Field of Classification Search
CPC . G06T 7/248; G06T 7/55; G06T 2207/10016; G06T 2207/10024; G06T 2207/10028
See application file for complete search history.

(56) References Cited

U.S. PATENT DOCUMENTS

| | | | |
|---|---|---|---|
| 2013/0113916 A1* | 5/2013 | Scheid | G06T 7/0004 348/85 |
| 2018/0029834 A1* | 2/2018 | Hu | B66B 21/02 |
| 2018/0029841 A1* | 2/2018 | Li | B66B 29/06 |
| 2018/0029842 A1* | 2/2018 | Li | B66B 21/02 |
| 2018/0032598 A1* | 2/2018 | Senger | G06T 7/194 |
| 2018/0306832 A1* | 10/2018 | Liu | B66B 25/006 |

FOREIGN PATENT DOCUMENTS

| | | |
|---|---|---|
| CN | 202358807 U | 8/2012 |
| CN | 102874665 A | 1/2013 |
| CN | 104071681 A | 10/2014 |
| CN | 204211329 U | 3/2015 |
| CN | 104528507 A | 4/2015 |
| CN | 104748708 A | 7/2015 |
| DE | 19826775 A1 | 12/1999 |

* cited by examiner

SPEED DETECTION SYSTEM OF PASSENGER CONVEYOR AND SPEED DETECTION METHOD THEREOF

FOREIGN PRIORITY

This application claims priority to Chinese Patent Application No. 201610613014.X, filed Jul. 29, 2016, and all the benefits accruing therefrom under 35 U.S.C. § 119, the contents of which in its entirety are herein incorporated by reference.

TECHNICAL FIELD

The present invention belongs to the field of Passenger Conveyor technologies, and relates to automatic speed detection of a passenger conveyor.

BACKGROUND ART

A passenger conveyor (such as an escalator or a moving walkway) is increasingly widely applied in public places such as subways, shopping malls, and airports, and the operation security thereof is increasingly important.

During operation, speed anomaly problems such as reverse running, speed anomaly, and sudden braking may occur in the passenger conveyor to lead to a large security accident. Therefore, a speed sensor may be generally mounted in the passenger conveyor to monitor the speed of the passenger conveyor. However, such a manner has the following problems: the passenger conveyor has a complicated structure and a high cost, and it is time-consuming and labor-consuming to acquire speed information data during maintenance testing.

SUMMARY OF THE INVENTION

According to one aspect of the present invention, a speed detection system of a passenger conveyor is provided, including: an imaging sensor and/or a depth sensing sensor configured to sense at least one part of the passenger conveyor to acquire sequence frames; and a processing apparatus configured to analyze the sequence frames to obtain at least speed information about steps of the passenger conveyor, which is configured to include: an optical flow estimation module configured to calculate, based on an optical flow method, a shift of a corresponding feature point between any adjacent frames in the sequence frames in frame coordinates; a calibration module configured to convert the shift of the feature point in the frame coordinates to a shift in three-dimensional space coordinates; a time calculation module configured to determine a time quantity between any adjacent frames in the sequence frames; and a speed calculation module configured to obtain by calculation, based on the shift of the feature point in the three-dimensional space coordinates and the corresponding time quantity, speed information of time points corresponding to any adjacent frames, and further combine the speed information to obtain speed information of the sequence frames.

According to another aspect of the present invention, a speed detection method of a passenger conveyor is provided, including the following steps: sensing, by an imaging sensor and/or a depth sensing sensor, at least one part of the passenger conveyor to acquire sequence frames; calculating, based on an optical flow method, a shift of a corresponding feature point between any adjacent frames in the sequence frames in frame coordinates; converting the shift of the feature point in the frame coordinates to a shift in three-dimensional space coordinates; determining a time quantity between any adjacent frames in the sequence frames; and obtaining by calculation, based on the shift of the feature point in the three-dimensional space coordinates and the corresponding time quantity, speed information of time points corresponding to any adjacent frames, and further combining the speed information to obtain speed information of the sequence frames.

According to a further aspect of the present invention, a passenger conveying system is provided, including a passenger conveyor and the speed detection system described above.

The foregoing features and operations of the present invention will become more evident according to the following descriptions and the accompanying drawings.

BRIEF DESCRIPTION OF THE DRAWINGS

In the following detailed description with reference to the accompanying drawings, the foregoing and other objectives and advantages of the present invention would be more complete and clearer, wherein identical or similar elements are indicated with identical reference signs.

DETAILED DESCRIPTION

The present invention is now described more completely with reference to the accompanying drawings. Exemplary embodiments of the present invention are illustrated in the accompanying drawings. However, the present invention may be implemented in lots of different forms, and should not be understood as being limited to the embodiments described herein. On the contrary, the embodiments are provided to make the disclosure thorough and complete, and fully convey the concept of the present invention to those skilled in the art.

Some block diagrams shown in the accompanying drawings are functional entities, and do not necessarily correspond to physically or logically independent entities. The functional entities may be implemented in the form of software, or the functional entities are implemented in one or more hardware modules or an integrated circuit, or the functional entities are implemented in different processing apparatuses and/or microcontroller apparatuses.

In the present invention, the passenger conveyor includes an Escalator and a Moving Walkway. In the following illustrated embodiments, the speed detection system and the speed detection method of the embodiments of the present invention are described in detail by taking the escalator as an example. However, it would be appreciated that the speed detection system and the speed detection method for an escalator in the following embodiments may also be analogically applied to a moving walkway. What might need to happen therein, for example, applicable improvements, can be obtained by those skilled in the art with the teachings of the embodiments of the present invention.

Figure 1:
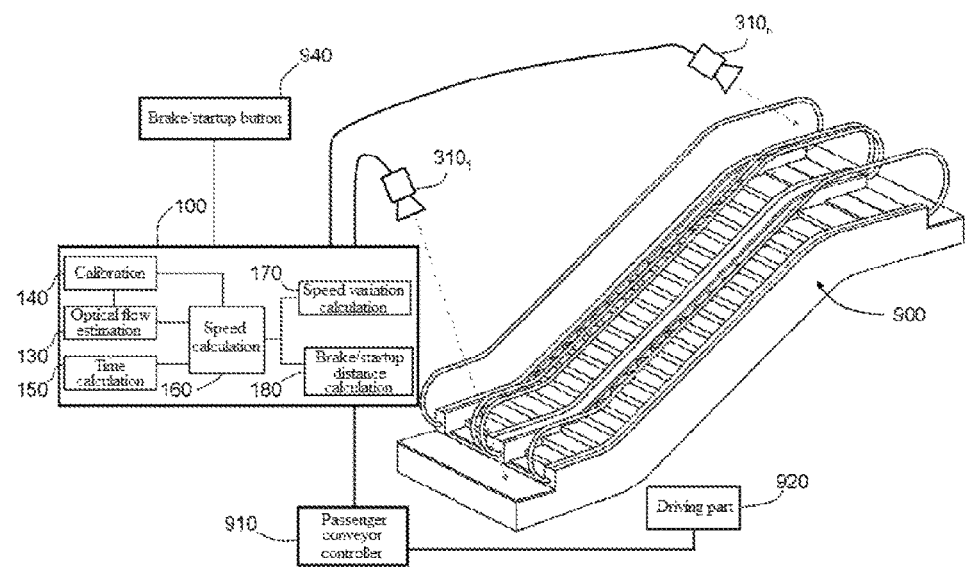
FIG. 1 is a schematic structural diagram of a speed detection system of a passenger conveyor according to an embodiment of the present invention.

FIG. 1 is a schematic structural diagram of a speed detection system of a passenger conveyor according to an embodiment of the present invention. The speed detection system in the embodiment shown in FIG. 1 may be configured to detect the speed of the passenger conveyor under a brake working condition or a startup working condition. When a speed sensor is mounted to the passenger conveyor in the prior art, during repair and maintenance of the escalator, it is necessary to manually borrow data from the speed sensor and read the data in a dedicated testing device to obtain accurate data of the brake working condition, for example, a braking distance, a braking deceleration variation, and the like. This is very time-consuming and labor-consuming, and the same problem exists during detection under the startup working condition.

The speed detection system in the embodiment shown in FIG. 1 is configured to detect a Step speed when an escalator 900 illustrated in FIG. 1 is under a brake working condition or a startup working condition, and specifically includes a sensing apparatus 310 and a processing apparatus 100 coupled to the sensing apparatus 310, and the escalator 900 includes a passenger conveyor controller 910, a driving part 920 such as a motor, and a brake/startup button 940.

The sensing apparatus 310 is specifically an Imaging Sensor or a Depth Sensing Sensor, or a combination thereof. According to a specific requirement and a range size of a region that can be monitored by the sensor, the escalator 900 may be provided with one or more sensing apparatuses 310, for example, $310_1$ to $310_n$, where N is an integer greater than or equal to 1. The sensing apparatus 310 is mounted in such a manner that it can relatively clearly and accurately acquire information of the escalator 900, and the specific mounting manner and mounting position are not limited.

The imaging sensor may be a 2D image sensor of various types. It should be understood that any image sensor capable of capturing an image frame including pixel brightness information may be applied herein. Definitely, an image sensor capable of capturing an image frame including pixel brightness information and color information (such as RGB information) may also be applied herein.

The depth sensing sensor may be any 1D, 2D or 3D depth sensor or a combination thereof. Such a sensor is operable in an optical, electromagnetic or acoustic spectrum capable of producing a depth map (also known as a point cloud or occupancy grid) with a corresponding dimension. Various depth sensing sensor technologies and devices include, but are not limited to, structured light measurement, phase shift measurement, time-of-flight measurement, a stereo triangulation device, an optical triangulation device plate, a light field camera, a coded aperture camera, a computational imaging technology, simultaneous localization and map-building (SLAM), an imaging radar, an imaging sonar, an echolocation device, a scanning LIDAR, a flash LIDAR, a passive infrared (PIR) sensor, and a small focal plane array (FPA), or a combination including at least one of the foregoing. Different technologies may include active (transmitting and receiving a signal) or passive (only receiving a signal) technologies and are operable in a band of electromagnetic or acoustic spectrum (such as visual and infrared).

Depth sensing may achieve particular advantages over conventional 2D imaging. Infrared sensing may achieve particular benefits over visible spectrum imaging. Alternatively or additionally, the sensor may be an infrared sensor with one or more pixel spatial resolutions, e.g., a passive infrared (PIR) sensor or a small IR focal plane array (FPA).

It should be noted that there may be qualitative and quantitative differences between a 2D imaging sensor (e.g., a conventional security camera) and the 1D, 2D, or 3D depth sensing sensor in terms of the extent that the depth sensing provides numerous advantages. In 2D imaging, a reflected color (a mixture of wavelengths) from the first object in each radial direction of the imager is captured. A 2D image, then, may include a combined spectrum of source lighting and a spectral reflectivity of an object in a scene. The 2D image may be interpreted by a person as a picture. In the 1D, 2D, or 3D depth-sensing sensor, there is no color (spectrum) information; more specifically, a distance (depth, range) to a first reflection object in a radial direction (1D) or directions (2D, 3D) from the sensor is captured. The 1D, 2D, and 3D technologies may have inherent maximum detectable range limits and may have a spatial resolution relatively lower than that of a typical 2D imager. In terms of relative immunity to ambient lighting problems, compared with the conventional 2D imaging, the 1D, 2D, or 3D depth sensing may advantageously provide improved operations, and better separation and better privacy protection of shielded objects. Infrared sensing may achieve particular benefits over visible spectrum imaging. For example, it is possible that a 2D image cannot be converted into a depth map and a depth map does not have a capability of being converted into a 2D image (for example, artificial allocation of continuous colors or brightness to continuous depths may cause a person to roughly interpret a depth map in a manner somewhat akin to how a person sees a 2D image, while the depth map is not an image in a conventional sense).

When the sensing apparatus 310 is specifically a combination of an imaging sensor and a depth sensing sensor, the sensing apparatus 310 may be an RGB-D sensor, which may acquire RGB information and depth (D) information at the same time.

The sensing apparatus 310 senses at least one part of steps of the escalator and obtains sequence frames in real time; if an imaging sensor is used for sensing and acquisition, the sequence frames are multiple image frames, wherein each pixel has, for example, corresponding brightness information and color information; if a depth sensing sensor is used for sensing and acquisition, the sequence frames are multiple depth maps, wherein each pixel or occupancy grid also has a corresponding depth dimension (reflecting depth information).

The multiple sensing apparatuses $310_1$ to $310_n$ acquire corresponding sequence frames when the brake/startup button (e.g., during daily maintenance and detection of the escalator) is pressed, and start to detect speed of steps of the escalator 920. The sequence frames are transmitted to the processing apparatus 100. The processing apparatus 100 is responsible for analyzing the sequence frames, and finally obtaining at least speed information about the steps of the escalator 900.

Specifically, the processing apparatus 100 is configured to include an optical flow estimation module 130 configured to calculate a feature point in the frame by using, for example, Moravec Corner Detection, Harris Corner Detection, Förstner Corner Detection, Laplacian of Gaussian Interest Points, Differences of Gaussians Interest Points, Hessian Scale-space Interest Points, Wang and Brady Corner detection, SUSAN Corner Detection, Trajkovic-Hedley Corner Detection, or the like. The feature point may be found through, for example, SIFT, SURF, ORB, FAST, BRIEF and other local feature descriptions. In addition, the feature point may be matched from one frame to next frame based on a large area pattern by using, for example, a sum of absolute differences, a convolution technique, or a probabilistic technique.

In addition, the optical flow estimation module 130 calculates, based on an optical flow method, a shift of a corresponding feature point between any adjacent frames in the sequence frames in frame coordinates. The optical flow method may be specifically a Lucas-Kanade optical flow method. The type of the optical flow method specifically applied herein is not limited. The system and the method disclosed herein can also be applied to any two frames of the sequence frames, wherein the corresponding feature point of the two frames can be found. The phrase "adjacent frames" should be understood as two frames for calculating an optical flow between frames.

By taking the sequence frames acquired by the imaging sensor as an example, the sequence frames are multiple image frames, for example, 15 to 30 image frames acquired per second, wherein each image frame has a corresponding brightness value. If the imaging sensor can acquire color information, each image frame pixel further has corresponding color information. When the speed of a step or the like is monitored, several points of an image corresponding to the step may be used as feature points. Specifically, points or small regions in an image of a moving step which have significantly different brightness distribution may be used as feature points. Each feature point may include one or more pixels. A speed vector is assigned to each pixel (including pixels of the feature point) in the image, to form an image moving field. When the image moving field is transferred to a two-dimensional image, it is indicated as an optical flow field. The optical flow field reflects a variation trend of brightness of each pixel on an image frame. For consecutive sequence frames, a corresponding frame coordinate position of a feature point on a frame may be determined. If the step moves, on next frame adjacent to the frame, a point having basically the same brightness value is searched around the same frame coordinate position to serve as the feature point. In the case that a same feature point on the two adjacent frames is determined, a shift in frame coordinates can be thus confirmed basically. Analogically, a shift of a corresponding feature point between any adjacent frames in frame coordinates can be determined. It should be understood that, if the feature point includes color information, it is possible to determine the feature point based on a brightness value and/or a chromaticity value and then determine the shift.

By taking the sequence frames acquired by the depth sensing sensor as an example, the sequence frames are multiple depth maps, for example, 15 to 30 depth maps acquired per second, where each frame includes depth map data of an object within a field of view sensed. When the speed of a step or the like is monitored, several occupancy grids of a depth map corresponding to the step may be used as feature points. Specifically, grids or small regions, in lots of occupancy grids corresponding to the moving step, whose depths significantly vary may be used as feature points. Each feature point may include one or more occupancy grids. A speed vector is assigned to each occupancy grid (including the occupancy grids of the feature point) in an image, to form an image moving field. When the image moving field is transferred to a two-dimensional image, it is indicated as an optical flow field. The optical flow field reflects a variation trend of the depth of each occupancy grid on a depth map. For consecutive sequence frames, a corresponding frame coordinate position of a feature point on a frame may be determined. If the step moves, on next frame adjacent to the frame, a point having basically the same depth value is searched around the same frame coordinate position to serve as the feature point. In the case that a same feature point on the two adjacent frames is determined, a shift in frame coordinates can be thus confirmed basically. Analogically, a shift of a corresponding feature point between any adjacent frames in frame coordinates can be determined.

It should be noted that the shift not only may include a shift magnitude, but also may include shift direction information.

The processing apparatus 100 is further configured to include a calibration module 140. The calibration module 140 converts the shift of the feature point in the frame coordinates to a shift in three-dimensional space coordinates, wherein the three-dimensional space coordinates may be established, for example, based on an imaging sensor, and the standard of the establishment thereof is not limited. The calibration process may be offline accomplished in advance before the speed detection. For example, calibration is performed again after mounting of the imaging sensor and/or the depth sensing sensor is completed or after the key setting thereof changes. The specific method adopted for calibration is not limited.

The processing apparatus 100 is further provided with a time calculation module 150 that determines a time quantity between any adjacent frames in the sequence frames. By taking that 30 frames are acquired per second as an example, a time quantity between adjacent frames is substantially 1/30 s. Specifically, each frame may be marked with a time stamp when acquired, and thus a time quantity between any frames can be acquired. It should be understood that "adjacent frames" may be consecutively acquired frames.

The processing apparatus 100 is further provided with a speed calculation module 160. The speed calculation module 160 obtains by calculation, based on the shift of the feature point in the three-dimensional space coordinates and the corresponding time quantity, speed information of time points corresponding to any adjacent frames, and further combines the speed information to obtain speed information of the sequence frames. By taking that there are n sequence frames acquired per second as an example, (n−1) pieces of speed information may be obtained per second, and the (n−1) pieces of speed information are combined together to obtain speed information of the n sequence frames. It should be noted that the speed information may include speed magnitude information and speed direction information. Thus, it is possible to judge, based on the speed direction information, whether the steps of the escalator 900 reversely run and judge, based on the speed magnitude information, whether speed anomaly occurs, for example, overspeed, underspeed, or the like.

When daily detection is carried out on the brake working condition/startup working condition of the escalator 900, the processing apparatus 100 is further configured to include a speed variation calculation module 170 and a brake/startup distance calculation module 180.

By taking the daily detection on the brake working condition as an example, after the brake button 940 is pressed, the sensing apparatus 310 is triggered to start to acquire frames, i.e., acquire sequence frames corresponding to a time period till the step is decelerated to a speed of 0. The speed calculation module 160 can acquire speed information of the sequence frames. The speed variation calculation module 170 further obtains by calculation, based on lots of pieces of speed information of the sequence frames, speed variation information of the sequence frames, and the speed variation calculation module 170 may be further configured to obtain a deceleration curve based on the speed variation information. The braking distance calculation module 180 may be configured to obtain by calculation, based on the speed information, braking distance information corresponding to the sequence frames. In an embodiment, smoothing filter may be performed on lots of pieces of speed information of the sequence frames. For example, a Finite Impulse Response Filter is used to filter out some pieces of speed information to obtain more reliable speed information. The finite impulse response filter has relatively fewer taps, and thus may not produce an evident lag, thereby being conducive to generating, based on the filtered speed information, a smooth and more accurate and reliable deceleration curve and more accurate and reliable braking distance information. Herein, another or longer filter may also be used. If a computation delay is acceptable, the filter may produce a filtered sequence without a lag even if applied to forward and backward sequences. The speed variation calculation module 170 may further compare the obtained deceleration curve with a predetermined deceleration curve to judge whether the brake working condition of the escalator 900 is normal, and the braking distance calculation module 190 may further judge, based on the braking distance information, whether the brake working condition of the escalator 900 is normal. Therefore, during daily detection, the brake working condition of the escalator 900 can be acquired very conveniently and quickly, which saves both time and labor.

It should be noted that, the speed variation calculation module 170 can naturally obtain a braking time based on the deceleration curve, i.e., a time period from triggering of the brake working condition to the time when the step is decelerated to a speed of 0. It is also possible to compare the braking time with a predetermined braking time range to judge whether the brake working condition of the escalator 900 is normal. When the brake working condition is judged based on the deceleration curve, if there is, for example, a sudden change beyond the range, it may be easy to cause a passenger to fall down during the braking, and the brake working condition may be regarded as abnormal.

When the brake working condition is judged as abnormal, escalator maintenance personnel may take corresponding repair and maintenance measures (e.g., regulate a braking apparatus or a driving part 920, replace a part and the like), to prevent occurrence of an accident.

By taking daily detection on the startup working condition as an example, after the startup button 940 is pressed, the sensing apparatus 310 is triggered to start to acquire frames, i.e., acquire sequence frames corresponding to a time period till the step is accelerated to a constant speed. The speed calculation module 160 can acquire speed information of the sequence frames. The speed variation calculation module 170 further obtains by calculation, based on lots of pieces of speed information of the sequence frames, speed variation information of the sequence frames. Based on a principle similar to that of the brake working condition, the speed variation calculation module 170 may be further configured to obtain an acceleration curve based on the speed variation information, and the braking distance calculation module 180 may be configured to obtain by calculation, based on the speed information, startup distance information corresponding to the sequence frames. Moreover, the speed variation calculation module 170 may further compare the obtained acceleration curve with a predetermined acceleration curve to judge whether the startup working condition of the escalator 900 is normal, and the braking distance calculation module 190 may further judge, based on the startup distance information, whether the startup working condition of the escalator 900 is normal.

In an embodiment, the deceleration curve or the acceleration curve, the braking distance information or the startup distance information, and the braking time or the startup time acquired during each daily maintenance can be stored in a storage module (not shown) of the processing apparatus 100 to form historical data. The processing apparatus 100 is further configured to analyze, based on the historical data, a data variation trend to predict occurrence of an abnormal brake/startup working condition. For example, if the historical data reflects that the braking distance is increasingly longer, it may be predicted that a braking distance at a time point may go beyond a predetermined braking distance range, and thus it is predicted that the brake working condition may be likely to be abnormal at this time point, and a corresponding measure (e.g., regulate the braking apparatus of the escalator 100) is taken in advance to change the variation trend of the braking distance. Thus, a measure can be taken without the precondition that an abnormal brake working condition is found, thereby avoiding occurrence of a safety accident.

A process of a speed detection method performed based on the speed detection system in the embodiment shown in FIG. 1 is illustrated in the following with reference to FIG. 2 and FIG. 3 respectively. The working principle of the speed detection system according to the embodiment of the present invention is further described with reference to FIG. 1, FIG. 2, and FIG. 3.

Figure 2:
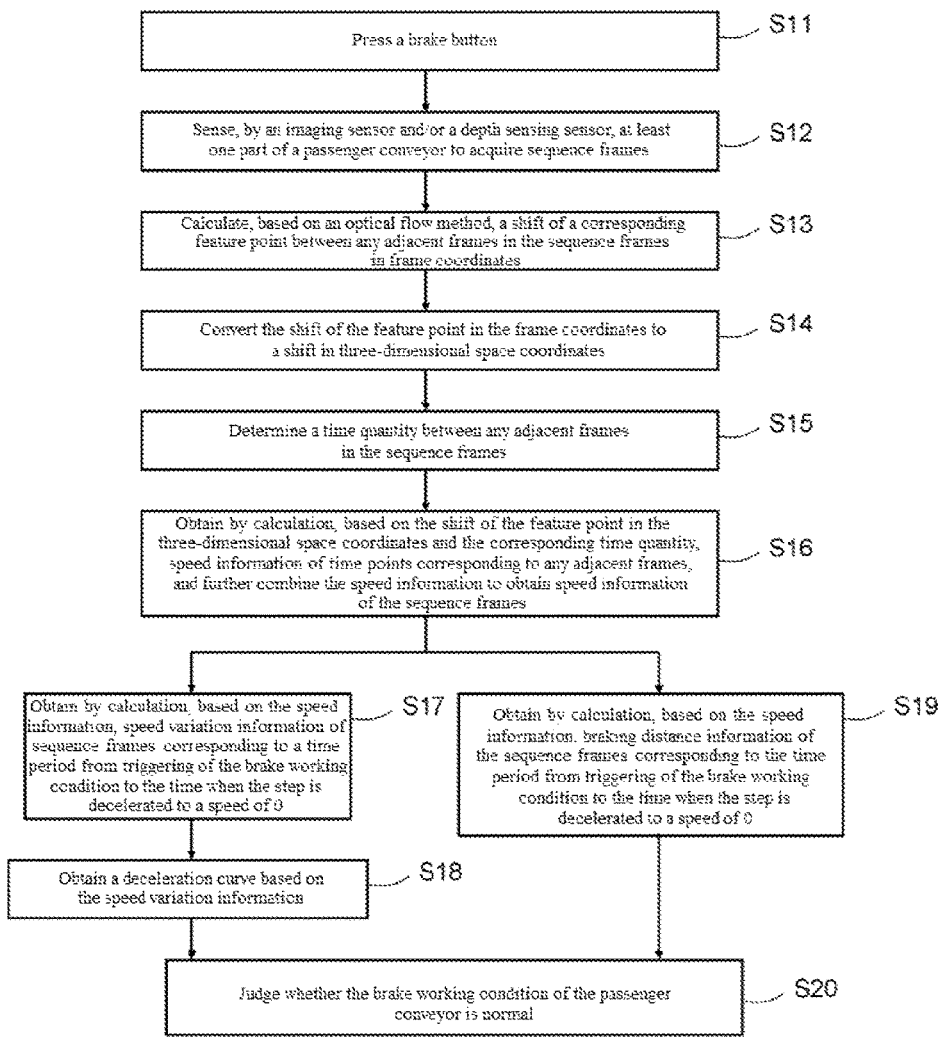
FIG. 2 is a schematic flow chart of a speed detection method of a passenger conveyor according to a first embodiment of the present invention.

By taking speed detection under the brake working condition as an example, as shown in FIG. 1 and FIG. 2, first of all, in step S11, the brake button 940 is pressed, and then the process proceeds to step S12, in which at least one part (e.g., steps in a predetermined region) of the passenger conveyor is sensed by an imaging sensor and/or a depth sensing sensor to acquire sequence frames.

Further, in step S13, a shift of a corresponding feature point between any adjacent frames in the sequence frames in frame coordinates is calculated based on an optical flow method. The specific calculation of the shift is accomplished in the optical flow estimation module 130. If the imaging sensor and the depth sensing sensor are used at the same time, corresponding shifts are calculated respectively based on the sequence frames acquired by the imaging sensor and the depth sensing sensor separately.

Further, in step S14, the shift of the feature point in the frame coordinates is converted to a shift in three-dimensional space coordinates. This step is accomplished in the calibration module 140. If the imaging sensor and the depth sensing sensor are used at the same time, corresponding shifts in three-dimensional space coordinates are obtained by calibration respectively based on the sequence frames acquired by the imaging sensor and the depth sensing sensor separately.

Further, in step S15, a time quantity between any adjacent frames in the sequence frames are determined. This step is accomplished in the time module 150. If the imaging sensor and the depth sensing sensor are used at the same time, time quantities are calculated respectively based on the sequence frames acquired by the imaging sensor and the depth sensing sensor separately.

Further, in step S16, speed information of time points corresponding to any adjacent frames is obtained by calculation based on the shift of the feature point in the three-dimensional space coordinates and the corresponding time quantity, and the speed information is further combined to obtain speed information of the sequence frames. This step is accomplished in the speed calculation module 160. If the imaging sensor and the depth sensing sensor are used at the same time, speed information is calculated respectively based on the sequence frames acquired by the imaging sensor and the depth sensing sensor separately.

Further, in step S17, speed variation information of sequence frames corresponding to a time period from triggering of the brake working condition to the time when the step stops is obtained by calculation based on the speed information. At the same time, in an embodiment, step S18 may be further performed, in which a deceleration curve is obtained based on the speed variation information. Step 17 and step S18 both can be accomplished in the speed variation calculation module 170.

At the same time, in step S19, braking distance information of the sequence frames corresponding to the time period from triggering of the brake working condition to the time when the step is decelerated to a speed of 0 is obtained by calculation based on the speed information. This step may be accomplished in the brake/startup distance calculation module 180 of the processing apparatus 100.

Further, in step S20, whether the brake working condition of the passenger conveyor is normal is judged and determined. In this step, the speed variation calculation module 170 may further compare the obtained deceleration curve with a predetermined deceleration curve to judge whether the brake working condition of the escalator 900 is normal. For example, if there is a sudden change beyond the range, it may be easy to cause a passenger to fall down during the braking, and the brake working condition may be regarded as abnormal. Definitely, in other embodiments, it is also possible to judge, based on a braking time obtained from the deceleration curve or the like, whether the brake working condition of the escalator 900 is normal. Moreover, the braking distance calculation module 190 may further judge, based on the braking distance information, whether the brake working condition of the escalator 900 is normal. Specifically, if the braking distance information is beyond a predetermined braking distance range, it is determined that the braking working condition is abnormal. It should be noted that, when any combination of one or more of the deceleration curve, the braking distance, and the braking time is judged as abnormal according to a specific situation, the brake working condition of the escalator 900 may be judged as abnormal.

So far, the speed detection process under the brake working condition in the above embodiment basically ends.

Figure 3:
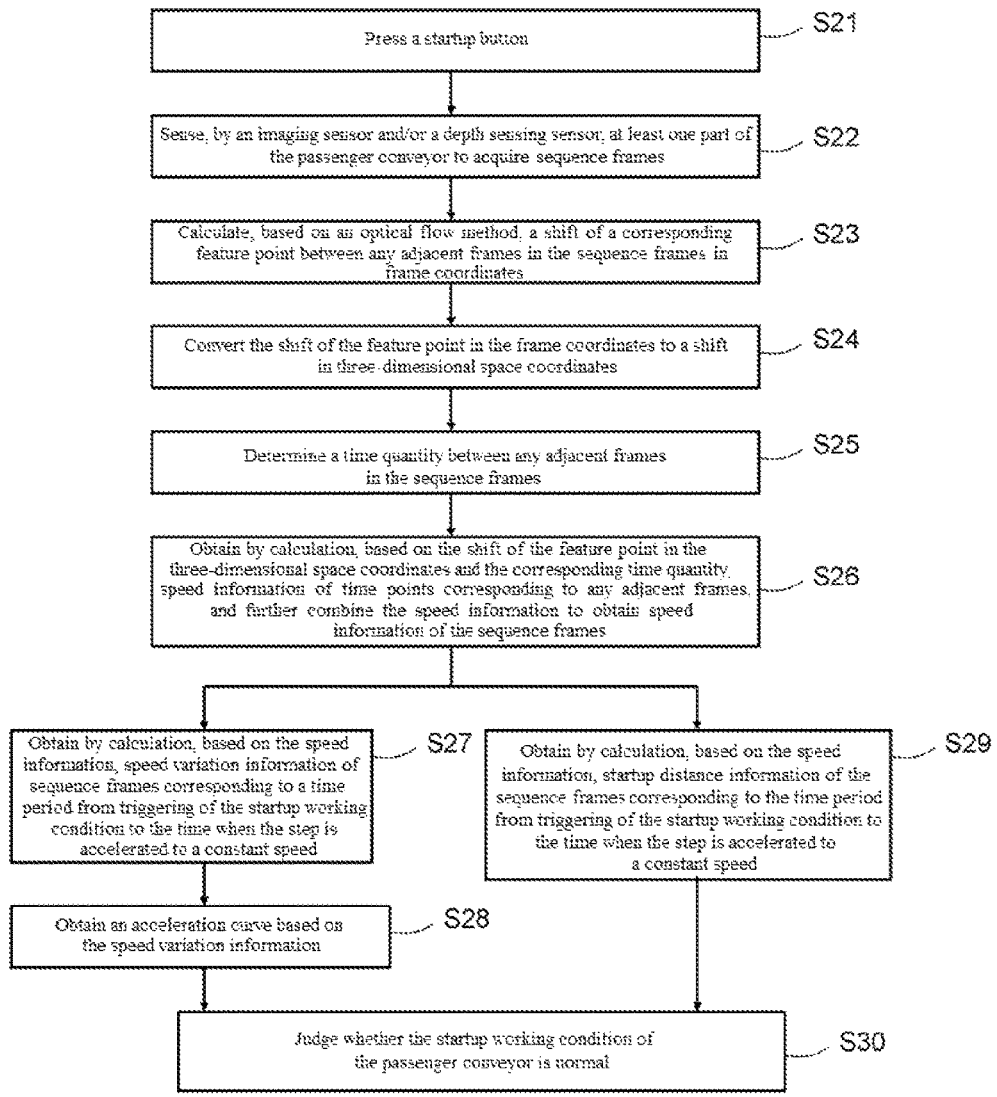
FIG. 3 is a schematic flow chart of a speed detection method of a passenger conveyor according to a second embodiment of the present invention.

By taking the speed detection under the startup working condition as an example, as shown in FIG. 1 and FIG. 3, first of all, in step S21, a startup button is pressed, and detection on a startup speed of the escalator is started. Then, the process proceeds to step S22, in which at least one part (e.g., steps in a predetermined region) of the passenger conveyor is sensed by an imaging sensor and/or a depth sensing sensor to acquire sequence frames.

Further, in step S23, a shift of a corresponding feature point between any adjacent frames in the sequence frames in frame coordinates is calculated based on an optical flow method. The specific calculation of the shift is accomplished in the optical flow estimation module 130. If the imaging sensor and the depth sensing sensor are used at the same time, corresponding shifts are calculated respectively based on the sequence frames acquired by the imaging sensor and the depth sensing sensor separately.

Further, in step S24, the shift of the feature point in the frame coordinates is converted to a shift in three-dimensional space coordinates. This step is accomplished in the calibration module 140. If the imaging sensor and the depth sensing sensor are used at the same time, corresponding shifts in three-dimensional space coordinates are obtained by calibration respectively based on the sequence frames acquired by the imaging sensor and the depth sensing sensor separately.

Further, in step S25, a time quantity between any adjacent frames in the sequence frames are determined. This step is accomplished in the time module 150. If the imaging sensor and the depth sensing sensor are used at the same time, time quantities are calculated respectively based on the sequence frames acquired by the imaging sensor and the depth sensing sensor separately.

Further, in step S26, speed information of time points corresponding to any adjacent frames is obtained by calculation based on the shift of the feature point in the three-dimensional space coordinates and the corresponding time quantity, and the speed information is further combined to obtain speed information of the sequence frames. This step is accomplished in the speed calculation module 160. If the imaging sensor and the depth sensing sensor are used at the same time, speed information is calculated respectively based on the sequence frames acquired by the imaging sensor and the depth sensing sensor separately.

Further, in step S27, speed variation information of sequence frames corresponding to a time period from triggering of the startup working condition to the time when the step is accelerated to a constant speed is obtained by calculation based on the speed information. At the same time, in an embodiment, step S28 may be further performed, in which an acceleration curve is obtained based on the speed variation information. Step 27 and step S28 both can be accomplished in the speed variation calculation module 170.

At the same time, in step S29, startup distance information of the sequence frames corresponding to the time period from triggering of the brake working condition to the time when the step is accelerated to a constant speed is obtained by calculation based on the speed information. This step may be accomplished in the brake/startup distance calculation module 180 of the processing apparatus 100.

Further, in step S20, whether the brake working condition of the passenger conveyor is normal is judged and determined. In this step, the speed variation calculation module 170 may further compare the obtained acceleration curve with a predetermined acceleration curve to judge whether the brake working condition of the escalator 900 is normal. For example, if there is a sudden change beyond the range, it may be easy to cause a passenger to fall down during the braking, and the brake working condition may be regarded as abnormal. Definitely, in other embodiments, it is also possible to judge, based on a startup time obtained from the acceleration curve or the like, whether the startup working condition of the escalator 900 is normal. Moreover, the startup distance calculation module 190 may further judge, based on the startup distance information, whether the startup working condition of the escalator 900 is normal. Specifically, if the startup distance information is beyond a predetermined startup distance range, it is determined that the startup working condition is abnormal. It should be noted that, when any combination of one or more of the acceleration curve, the startup distance, and the startup time is judged as abnormal according to a specific situation, the startup working condition of the escalator 900 may be judged as abnormal.

So far, the speed detection process under the startup working condition in the above embodiment basically ends.

It should be noted that, in the speed detection method of the embodiment shown in FIG. 2 and FIG. 3, the deceleration curve or the acceleration curve, the braking distance or the startup distance, and the braking time or the startup time obtained during each daily maintenance can be stored in a storage module (not shown) of the processing apparatus 100 to form historical data The processing apparatus 100 may further analyze, based on the historical data, a data variation trend to predict occurrence of an abnormal brake/startup working condition, thus being able to make pre-judgment and avoiding occurrence of a safety accident.

The speed detection method for the escalator 900 under the brake working condition or the startup working condition can replace the existing method of manually reading data from a complicated speed sensor, which even does not require a worker to operate on site, saves both time and labor, and can avoid the problem of inaccurate reading of the speed caused by nonstandard or incorrect manual operations, less hardware is added, and the implementation cost is low.

Figure 4:
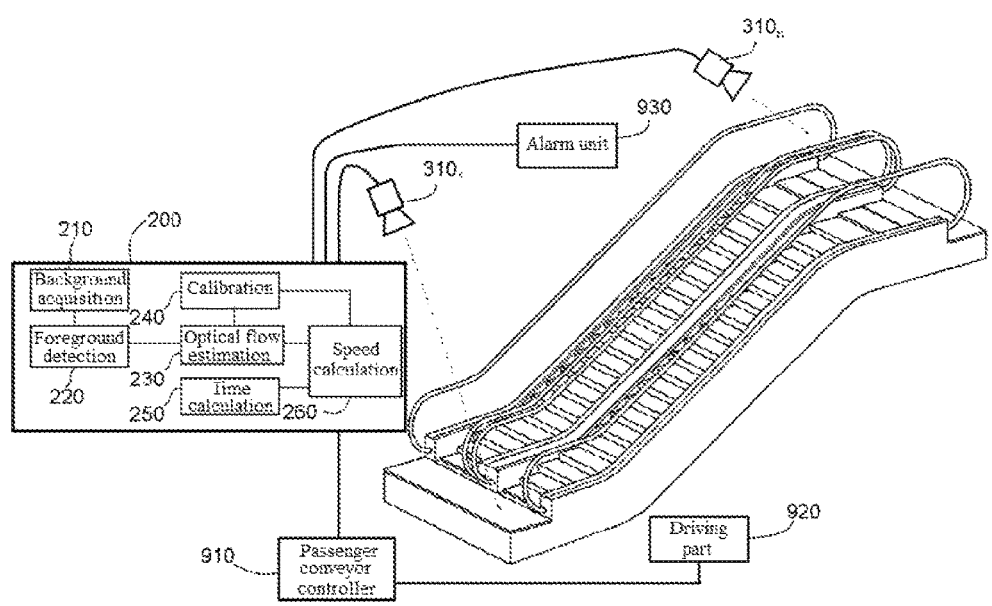
FIG. 4 is a schematic structural diagram of a speed detection system of a passenger conveyor according to another embodiment of the present invention.

FIG. 4 is a schematic structural diagram of a speed detection system of a passenger conveyor according to another embodiment of the present invention. The speed detection system of the embodiment shown in FIG. 4 may be configured to detect a speed of the passenger conveyor under a daily operation condition. Compared with the speed detection system configured to detect a speed under a brake working condition or a startup working condition shown in FIG. 1, speed detection under the daily operation condition does not occur in daily maintenance, but occurs, for example, during daily normal operation of the passenger conveyor when there is a passenger, which is capable of monitoring the speed of the escalator 900 or the like in real time.

The speed detection system of the embodiment shown in FIG. 4 is configured to monitor a running speed of Steps and/or a handrail of an escalator 900 illustrated in FIG. 4. Specifically, the speed detection system includes a sensing apparatus 310 and a processing apparatus 200 coupled to the sensing apparatus 310, and the escalator 900 includes a passenger conveyor controller 910, a driving part 920 such as a motor, and a brake/startup button 940.

The specific setting of the sensing apparatus 310 is completely the same as that in the embodiment shown in FIG. 1, and thus the description thereof is omitted herein.

The multiple sensing apparatuses $310_1$ to $310_n$ can acquire corresponding sequence frames when the escalator 900 is under a daily operation condition, to monitor the speed of the steps of the escalator 920 in real time. The sequence frames are transmitted to the processing apparatus 200. The processing apparatus 200 is responsible for analyzing the sequence frames, and finally obtaining speed information about the steps and/or the handrail of the escalator 900.

Specifically, the processing apparatus 200 is configured to include an optical flow estimation module 230, a calibration module 240, a time calculation module 250, and a speed calculation module 260. The working principles of the optical flow estimation module 230, the calibration module 240, the time calculation module 250, and the speed calculation module 260 are respectively substantially the same as those of the optical flow estimation module 130, the calibration module 140, the time calculation module 150, and the speed calculation module 160 in the processing apparatus 100 of the embodiment shown in FIG. 1, which are not repeated herein one by one.

As passengers are changed and movable when the escalator 900 is under a daily operation condition, the optical flow estimation module 230 cannot obtain shift information accurately if a passenger region in the sequence frames are analyzed. To this end, in this embodiment, the processing apparatus 200 is further provided with a background acquisition module 210 and a foreground detection module 220. The background acquisition module 210 uses a 2D image or a 3D depth map when the escalator 900 has no load (i.e., there are no passengers) as a background. Therefore, the background acquisition module 210 learns to acquire a background model based on sequence frames acquired when the escalator 900 is under a no-load normal operation condition. The background model may be established in an initialization stage of the speed detection system, that is, before the speed under a daily operation condition is monitored, the speed detection system is initialized to obtain the background model. The background model may be established through learning by using, but not limited to, a Gaussian Mixture Model (GMM), a Code Book Model, Robust Principle Components Analysis (RPCA), and the like. The sequence frames acquired by the image sensor is learned to obtain a background model, which is a typical brightness background model or a chromaticity background model; the sequence frames acquired by the depth sensing sensor is learned to obtain a background model, which is a depth background model found by, for example, RPCA. In an embodiment, it is also possible to fuse multiple sequence frames within a period of time to learn and establish a background model to improve the precision of the background model.

It should be understood that, in the following speed detection stage, the background model may be updated adaptively. When an application scene, sensor type or setting changes, a corresponding background model may be acquired once again through learning in the initialization stage.

The foreground detection module 220 may be configured to first compare each frame of sequence frames acquired in real time with the background model to obtain a foreground object. The foreground object is, under most circumstances, a passenger and an article carried by the passenger and the like. By obtaining the foreground object, information of a position or region where the foreground object is located in each frame may be obtained. Specifically, in the process of obtaining the foreground object by comparison, if the imaging sensor is used, the data frame is a 2D image, the background model is also formed based on a 2D image, and the comparison process may specifically be differential processing. For example, a pixel in the 2D image is compared with a corresponding pixel of the background model to calculate a difference (e.g., a brightness difference), the pixel is retained when the difference is greater than a predetermined value, and thus a foreground object can be obtained. If a depth sensing sensor is used, the data frame is a depth map, and the background model is also formed based on a 3D depth map. For example, an occupancy grid of the depth map may be compared with a corresponding occupancy grid in the background model (e.g., a depth difference is calculated), depth information of the occupancy grid is retained (indicating that the occupancy grid is) when the difference is greater than a predetermined value, and thus a foreground object can be obtained.

The foreground detection module 220 may further define a region where the sequence frames have no foreground object as a speed sensing region. For example, a region in each frame where passenger interference does not exist (for example, a step on which no passenger stands or a handrail region with color identifications not covered by a hand of a passenger) is used to detect and judge a speed. The color identification may be understood as any reliable mark capable of being detected by the sensor 310 and applied to the handrail or the handrail region.

In an embodiment, the foreground detection module 220 may remove noise of the foreground object by using some filter technologies, for example, remove the noise by using erosion and dilation image processing technologies.

After the foreground detection module 220 defines the speed sensing region in the sequence frames, the optical flow estimation module 230 is configured to calculate, based on an optical flow method, a shift of a corresponding feature point in a speed sensing region between any adjacent frames in the sequence frames in frame coordinates. The optical flow method calculation principle is completely the same as the calculation principle in the optical flow estimation module 130, and thus is not described in detail herein.

Continuously as shown in FIG. 4, similarly, based on the processing performed by the calibration module 240, the time calculation module 250, and the speed calculation module 260, the speed information of the sequence frames which includes speed magnitude information and speed direction information can be obtained. In this way, the speed calculation module 260 can further judge, based on the speed direction information, whether reverse running occurs, and judge, based on the speed magnitude information, whether speed anomaly occurs (for example, judge whether the speed is beyond a predetermined speed magnitude). In this way, the daily operation condition of the escalator 900 can be monitored in real time, and the problem of an abnormal running speed of the escalator 900 can be found timely.

It should be noted that, in another embodiment, when there are more passengers on the escalator 900 or the escalator 900 is crowded, it may be difficult to acquire the speed sensing region of the steps. In this case, it is also possible to directly acquire a foreground object such as a passenger on the escalator 900 by the foreground detection module 220, and the optical flow estimation module 230 calculates a feature point based on the foreground object and calculates, based on an optical flow method, a shift of a corresponding feature point of a foreground object between any adjacent frames in the sequence frames in frame coordinates. In other words, the shift of the foreground object is calculated also based on the optical flow method. In this embodiment, as there is a possibility that the passenger moves by himself/herself, the shift calculation may be inaccurate, resulting in that the speed calculation may have an error. However, the running speed of the escalator 900 finally calculated based on the shift can basically reflect reverse running, obvious overspeed and other speed anomaly situations, and thus can also be used to monitor the daily operation condition of the escalator.

When the speed calculation module 260 finds that the speed of the escalator 900 is abnormal (e.g., speed anomaly or reverse running), a corresponding signal can be sent to the passenger conveyor controller 910 of the escalator 900, to take a corresponding measure. For example, the controller 910 further sends a signal to the driving part 920 to reduce the running speed of the step and the handrail, and the processing apparatus 200 may further send a signal to an alarm unit 930 mounted above the escalator 900, to remind the passengers to pay attention and prevent falls. Definitely, the processing apparatus 200 may further send a signal to an elevator maintenance center of a building or the like, to prompt a timely on-site processing. The measure specifically taken when it is found that the running speed of the escalator 900 is abnormal is not limited.

The processes of methods for step speed detection and handrail speed detection based on the speed detection system in the embodiment shown in FIG. 4 are illustrated respectively in the following with reference to FIG. 5 and FIG. 6. The working principle of the speed detection system according to the embodiment of the present invention is further described with reference to FIG. 4, FIG. 5, and FIG. 6.

Figure 5:
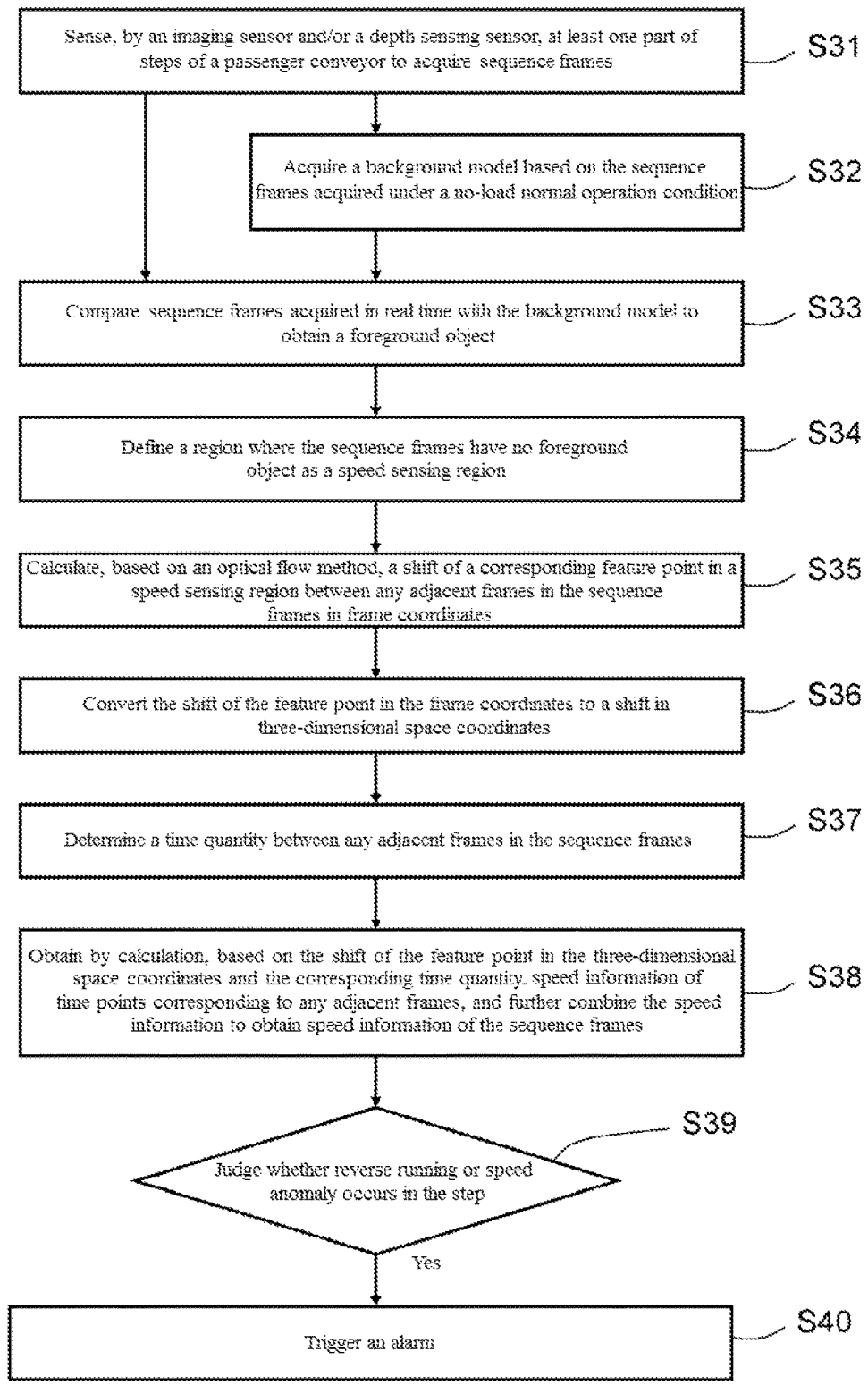
FIG. 5 is a schematic flow chart of a speed detection method of a passenger conveyor according to a third embodiment of the present invention.

By taking the running speed of the step of the escalator 900 under a daily operation condition as an example, as shown in FIG. 4 and FIG. 5, first of all, in step S31, at least one part of steps of the passenger conveyor are sensed by an imaging sensor and/or a depth sensing sensor to acquire sequence frames. When a background model is acquired through learning, the sequence frames are acquired through sensing under a no-load normal operation condition. Under other circumstances, the sequence frames are acquired at any time under a daily operation condition. For example, sequence frames within a time period of 1 s or less than 1 s can be acquired for subsequent analysis.

Further, in step S32, a background model is acquired based on the sequence frames acquired when the passenger conveyor is under the no-load normal operation condition. This step is accomplished in the background acquisition module 210, which may be implemented at an initialization stage of the system, or may adaptively update and acquire a background model, for example, by using an adaptive background algorithm such as GMM or RPCA. If the imaging sensor and the depth sensing sensor are used at the same time, background models are learned and acquired respectively based on the sequence frames acquired by the imaging sensor and the depth sensing sensor separately.

Further, in step S33, the sequence frames acquired in real time are compared with the background models one by one to obtain foreground objects. This step is accomplished in the foreground detection module 220.

Further, in step S34, regions where the sequence frames have no foreground object are defined as speed sensing regions. This step is accomplished in the foreground detection module 220 by processing the frames one by one.

Further, in step S35, a shift of a corresponding feature point in a speed sensing region between any adjacent frames in the sequence frames in frame coordinates is calculated based on an optical flow method. The specific calculation of the shift is accomplished in the optical flow estimation module 230. In another embodiment, when it is difficult to define the speed sensing region, it is also possible to calculate, based on an optical flow method, a shift of a corresponding feature point of a foreground object between any adjacent frames in the sequence frames in frame coordinates.

Further, in step S36, the shift of the feature point in the frame coordinates is converted to a shift in three-dimensional space coordinates. This step is accomplished in the calibration module 240.

Further, in step S37, a time quantity between any adjacent frames in the sequence frames are determined. This step is accomplished in the time calculation module 250.

Further, in step S38, speed information of time points corresponding to any adjacent frames is obtained by calculation based on the shift of the feature point under the space coordinate and the corresponding time quantity, and the speed information is further combined to obtain speed information of the sequence frames. This step is accomplished in the speed calculation module 260.

Further, in step S39, it is judged whether reverse running or speed anomaly occurs in the step, and if the judgment result is "yes", an alarm is triggered, i.e., step S40, in which a braking unit of the escalator may also be triggered to carry out braking. Step S39 is accomplished in the speed calculation module 260, which may judge, based on the speed direction information, whether step reverse running occurs, and judge, based on the speed magnitude information, whether step speed anomaly occurs. In step S40, a signal may also be sent to the controller 910 of the escalator 900, to control the speed or braking of the escalator 900 or the like. The measure specifically taken when it is found that the running speed of the escalator 900 is abnormal is not limited.

So far, the process of step speed detection under a daily operation condition in the above embodiment basically ends. The process may be repeated and continuously performed, to continuously monitor the running speed of the steps of the escalator 900. It should be noted that, if the imaging sensor and the depth sensing sensor are used at the same time, they will acquire respective sequence frames separately. In steps S32 to S38, the respective sequence frames are processed separately.

Figure 6:
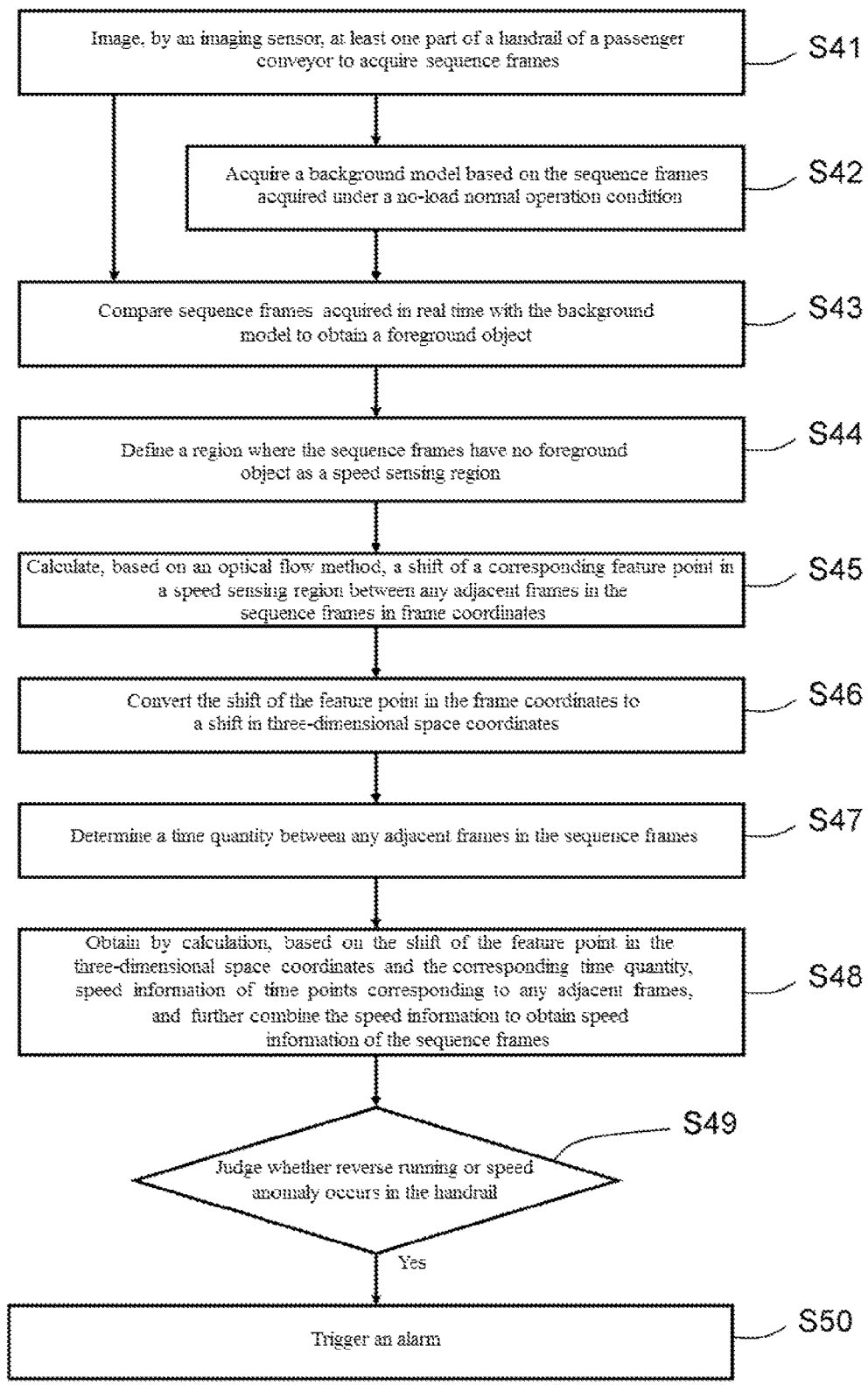
FIG. 6 is a schematic flow chart of a speed detection method of a passenger conveyor according to a fourth embodiment of the present invention.

By taking the detection on the running speed of the handrail of the escalator 900 under a daily operation condition as an example, as shown in FIG. 4 and FIG. 6, speed detection of the handrail is implemented only by using an imaging sensor, being an image sensor capable of acquiring color information or brightness information. Moreover, the handrail is provided with one or more colorful color identifications whose color is evidently distinguished from the color of the handrail.

First of all, in step S41, at least one part of the handrail of the passenger conveyor is imaged by an imaging sensor to acquire sequence frames. When a background model is acquired through learning, the sequence frames are acquired through sensing under a no-load normal operation condition. Under other circumstances, the sequence frames are acquired at any time under a daily operation condition. For example, sequence frames within a time period of 1 s or less than 1 s can be acquired for subsequent analysis.

Further, in step S42, a background model is acquired based on the sequence frames acquired when the passenger conveyor is under the no-load normal operation condition. This step is accomplished in the background acquisition module 210, which may be implemented at an initialization stage of the system, or may adaptively update and acquire a background model, for example, by using a method such as GMM or RPCA.

Further, in step S43, the sequence frames acquired in real time are compared with the background model one by one to obtain foreground objects. This step is accomplished in the foreground detection module 220.

Further, in step S44, a region where the sequence frames have no foreground object is defined as a speed sensing region. This step is accomplished in the foreground detection module 220.

Further, in step S45, a shift of a corresponding feature point in a speed sensing region between any adjacent frames in the sequence frames in frame coordinates is calculated based on the optical flow method. This step is accomplished in the optical flow estimation module 230 by processing the frames one by one. For the selection of the feature point, a pixel or pixel region in a moving handrail image whose chromaticity or brightness changes significantly may be used as the feature point, for example, a point at an edge of the color identification. In the optical flow method calculation process, the optical flow field reflects a variation trend of chromaticity or brightness of each point on an image frame, and a shift of a corresponding feature point between adjacent frames in frame coordinates is determined based on a chromaticity or brightness value.

Further, in step S46, the shift of the feature point in the frame coordinates is converted to a shift in three-dimensional space coordinates. This step is accomplished in the calibration module 240.

Further, in step S47, a time quantity between any adjacent frames in the sequence frames are determined. This step is accomplished in the time calculation module 250.

Further, in step S48, speed information of time points corresponding to any adjacent frames is obtained by calculation based on the shift of the feature point under the space coordinate and the corresponding time quantity, and the speed information is further combined to obtain speed information of the sequence frames. This step is accomplished in the speed calculation module 260.

Further, in step S49, it is judged whether reverse running or speed anomaly occurs in the handrail, and if the judgment result is "yes", an alarm is triggered, i.e., step S50, in which a braking unit of the escalator may also be triggered to carry out braking. Step S39 is accomplished in the speed calculation module 260, which may judge, based on the speed direction information, whether handrail reverse running occurs, and judge, based on the speed magnitude information, whether handrail speed anomaly occurs.

So far, the process of handrail speed detection under a daily operation condition in the above embodiment basically ends. The process may be repeated and continuously performed, to continuously monitor the running speed of the handrail of the escalator 900.

The speed detection method of the steps or handrail in the above embodiments may be accomplished based on an imaging sensor or a depth sensing sensor, and may be accomplished in place of the existing speed sensor; moreover, the speed detection method is capable of monitoring, in real time, the speed of the escalator under a daily operation condition, can timely find abnormal running of the escalator, has a high intelligence degree, and can effectively ensure security of passengers.

In the speed detection systems of the embodiments as shown in FIG. 1 and FIG. 4 and the speed detection methods of the embodiments as shown in FIG. 2, FIG. 3, and FIG. 4, if the speed detection system uses the imaging sensor and the depth sensing sensor at the same time, the sequence frames will include first sequence frames acquired by the imaging sensor and second sequence frames acquired by the depth sensing sensor; the optical flow estimation module, the calibration module, the time calculation module, and the speed calculation module are all configured to perform processing for the first sequence frames and the second sequence frames respectively to obtain first speed information and second speed information separately. In an embodiment, the speed calculation module obtains by weighting calculation, based on the first speed information and the second speed information, the speed information of the sequence frames acquired by the imaging sensor and the depth sensing sensor. In this way, there is a possibility that the speed information obtained based on respective calculation made by the imaging sensor and the depth sensing sensor is incorrect. For example, when the imaging sensor is in an ambient light intensity that changes greatly, it may result in that the first speed information obtained by calculation is relatively incorrect, while when the depth sensing sensor is in an environment condition of incorrect acquisition of depth information, it may also result in that the second speed information obtained by calculation is relatively incorrect. Therefore, the accuracy of the speed detection can be improved by weighting calculation on the first speed information and the second speed information. It should be understood that the specific weighted proportion can be determined according to an actual application environment condition or the like.

It should be noted that the processing apparatus (100 or 200) in the speed detection systems of the embodiments as shown in FIG. 1 and FIG. 4 may be specifically arranged in a control center of a building, and may also be integrated with the controller 910 of the escalator 900. The specific setting manner thereof is not limited.

It should be noted that the elements disclosed and depicted herein (including flowcharts and block diagrams in the accompanying drawings) imply logical boundaries between the elements. However, according to software or hardware engineering practices, the depicted elements and the functions thereof may be executed on machines through a computer executable medium. The computer executable medium has a processor capable of executing program instructions stored thereon as monolithic software structures, as standalone software modules, or as modules that employ external routines, code, services, and so forth, or any combination thereof, and all such implementations may fall within the scope of the present disclosure.

Although the different non-limiting implementation solutions have specifically illustrated components, the implementation solutions of the present invention are not limited to those particular combinations. It is possible to use some of the components or features from any of non-limiting implementation solutions in combination with features or components from any of the other non-limiting implementation solutions.

Although particular step sequences are shown, disclosed, and claimed, it should be appreciated that the steps may be performed in any order, separated or combined unless otherwise indicated and will still benefit from the present disclosure.

The foregoing description is exemplary rather than defined by the limitations within. Various non-limiting implementation solutions are disclosed herein, however, persons of ordinary skill in the art would recognize that various modifications and variations in light of the above teachings will fall within the scope of the appended claims. It is therefore to be appreciated that within the scope of the appended claims, the disclosure may be practiced other than as specifically disclosed. For that reason, the appended claims should be studied to determine the true scope and content.

What is claimed is:

1. A speed detection system of a passenger conveyor, comprising:
   an imaging sensor and/or a depth sensing sensor configured to sense at least one part of the passenger conveyor to acquire sequence frames; and
   a processing apparatus configured to analyze the sequence frames to obtain at least speed information about steps of the passenger conveyor, which is configured to comprise:
      an optical flow estimation module configured to calculate, based on an optical flow method, a shift of a corresponding feature point between any adjacent frames in the sequence frames in frame coordinates;
      a calibration module configured to convert the shift of the feature point in the frame coordinates to a shift in three-dimensional space coordinates;
      a time calculation module configured to determine a time quantity between any adjacent frames in the sequence frames; and
      a speed calculation module configured to obtain by calculation, based on the shift of the feature point in the three-dimensional space coordinates and the corresponding time quantity, speed information of time points corresponding to any adjacent frames, and further combine the speed information to obtain speed information of the sequence frames.

2. The speed detection system of claim 1, wherein the speed detection system is configured to detect at least speed information about steps of the passenger conveyor under a brake working condition or a startup working condition.

3. The speed detection system of claim 2, wherein when the speed detection system is configured to detect the speed information of the passenger conveyor under the brake working condition, the imaging sensor and/or the depth sensing sensor start/starts to acquire the sequence frames while the brake working condition is triggered;
   wherein the processing apparatus is further configured to further comprise:
   a speed variation calculation module configured to obtain by calculation, based on the speed information, speed variation information of sequence frames corresponding to a time period from triggering of the brake working condition to the time when the step is decelerated to a speed of 0.

4. The speed detection system of claim 2, wherein when the speed detection system is configured to detect the speed information of the passenger conveyor under the startup working condition, the imaging sensor and/or the depth sensing sensor start/starts to acquire the sequence frames while the startup working condition is triggered;
   wherein the processing apparatus is further configured to further comprise:
   a speed variation calculation module configured to obtain by calculation, based on the speed information, speed variation information of sequence frames corresponding to a time period from triggering of the startup working condition to the time when the step is accelerated to a constant speed.

5. The speed detection system of claim 1, wherein the speed detection system is configured to monitor at least speed information about steps of the passenger conveyor under a daily operation condition.

6. The speed detection system of claim 5, wherein the processing apparatus is configured to further comprise:
   a background acquisition module configured to acquire a background model based on sequence frames acquired when the passenger conveyor is determined to be under a no-load normal operation condition; and
   a foreground detection module configured to compare sequence frames acquired in real time with the background model to obtain a foreground object, subtract the corresponding foreground object from the sequence frames acquired in real time, and then define a region where the sequence frames have no foreground object as a speed sensing region;
   wherein the optical flow estimation module is configured to calculate, based on an optical flow method, a shift of a corresponding feature point in a speed sensing region between any adjacent frames in the sequence frames in frame coordinates.

7. The speed detection system of claim 5, wherein the processing apparatus is configured to further comprise:
a background acquisition module configured to acquire a background model based on sequence frames acquired when the passenger conveyor is determined to be under a no-load normal operation condition; and
a foreground detection module configured to compare sequence frames acquired in real time with the background model to obtain a foreground object;
wherein the optical flow estimation module is configured to calculate, based on an optical flow method, a shift of a corresponding feature point of a foreground object between any adjacent frames in the sequence frames in frame coordinates.

8. The speed detection system of claim 1, wherein when the speed detection system comprises both the imaging sensor and the depth sensing sensor, the sequence frames comprises first sequence frames acquired by the imaging sensor and second sequence frames acquired by the depth sensing sensor; and the optical flow estimation module, the calibration module, the time calculation module, and the speed calculation module are all configured to perform processing for the first sequence frames and the second sequence frames respectively to obtain first speed information and second speed information separately.

9. The speed detection system of claim 8, wherein the speed calculation module is further configured to obtain, based on the first speed information and the second speed information, the speed information by weighting calculation.

10. The speed detection system of claim 8, wherein the imaging sensor and the depth sensing sensor are integrated into an RGB-D sensor.

11. The speed detection system of claim 1, wherein if the sequence frames are acquired through sensing by the imaging sensor, an optical flow field used for calculation of the optical flow method in the optical flow estimation module reflects a variation trend of brightness and/or chromaticity of each pixel on the frame.

12. The speed detection system of claim 1, wherein if the sequence frames are acquired through sensing by the depth sensing sensor, an optical flow field used for calculation of the optical flow method in the optical flow estimation module reflects a variation trend of depth of each occupancy grid on the frame.

13. The speed detection system of claim 1, wherein the speed calculation module is further configured to perform smoothing filter processing on multiple pieces of speed information corresponding to the sequence frames, and speed information left after filtering is combined to form the speed information of the sequence frames.

14. A speed detection method of a passenger conveyor, comprising steps of:
sensing, by an imaging sensor and/or a depth sensing sensor, at least one part of the passenger conveyor to acquire sequence frames;
calculating, based on an optical flow method, a shift of a corresponding feature point between any adjacent frames in the sequence frames in frame coordinates;
converting the shift of the feature point in the frame coordinates to a shift in three-dimensional space coordinates;
determining a time quantity between any adjacent frames in the sequence frames; and obtaining by calculation, based on the shift of the feature point in the three-dimensional space coordinates and the corresponding time quantity, speed information of time points corresponding to any adjacent frames, and further combining the speed information to obtain speed information of the sequence frames.

15. The speed detection method of claim 14, wherein the speed detection method is used for detecting the speed information of the passenger conveyor under a brake working condition, and in the step of acquiring sequence frames, the imaging sensor and/or the depth sensing sensor start/starts to acquire the sequence frames while the brake working condition is triggered;
wherein the speed detection method further comprises a step of:
obtaining by calculation, based on the speed information, speed variation information of sequence frames corresponding to a time period from triggering of the brake working condition to the time when the step is decelerated to a speed of 0.

16. The speed detection method of claim 15, further comprising a step of:
obtaining a deceleration curve based on the speed variation information, and comparing the deceleration curve with a predetermined deceleration curve to judge whether the brake working condition of the passenger conveyor is normal.

17. The speed detection method of claim 15, further comprising a step of:
obtaining by calculation, at least based on the speed information, braking distance information corresponding to the time period from triggering of the brake working condition to the time when the step is decelerated to a speed of 0, and judge, based on the braking distance information, whether the brake working condition of the passenger conveyor is normal.

18. The speed detection method of claim 14, wherein the speed detection method is used for detecting the speed information of the passenger conveyor under a startup working condition, and in the step of acquiring sequence frames, the imaging sensor and/or the depth sensing sensor start/starts to acquire the sequence frames while the startup working condition is triggered;
wherein the speed detection method further comprises a step of:
obtaining by calculation, based on the speed information, speed variation information of sequence frames corresponding to a time period from triggering of the startup working condition to the time when the step is accelerated to a constant speed.

19. The speed detection method of claim 18, further comprising a step of:
obtaining an acceleration curve based on the speed variation information, and comparing the acceleration curve with a predetermined acceleration curve to judge whether the startup working condition of the passenger conveyor is normal.

20. The speed detection method of claim 18, further comprising a step of:
obtaining by calculation, at least based on the speed information, startup distance information of the sequence frames corresponding to the time period from triggering of the startup working condition to the time when the step is accelerated to a constant speed, and judging, based on the startup distance information, whether the startup working condition of the passenger conveyor is normal.

21. The speed detection method of claim 14, wherein the speed detection method is used for monitoring at least speed information about steps of the passenger conveyor under a daily operation condition.

22. The speed detection method of claim 21, further comprising steps of:
acquiring a background model based on sequence frames acquired when the passenger conveyor is determined to be under a no-load normal operation condition; and
comparing sequence frames acquired in real time with the background model to obtain a foreground object, subtracting the corresponding foreground object from the sequence frames acquired in real time, and then defining a region where the sequence frames have no foreground object as a speed sensing region;
wherein in the optical flow method calculation step, a shift of a corresponding feature point in a speed sensing region between any adjacent frames in the sequence frames in frame coordinates is calculated based on the optical flow method.

23. The speed detection method of claim 21, further comprising steps of:
acquiring a background model based on sequence frames acquired when the passenger conveyor is determined to be under a no-load normal operation condition; and
comparing sequence frames acquired in real time with the background model to obtain a foreground object;
wherein in the optical flow method calculation step, a shift of a corresponding feature point of a foreground object between any adjacent frames in the sequence frames in frame coordinates is calculated based on the optical flow method.

24. The speed detection method of claim 22, wherein the speed information comprises speed magnitude information and speed direction information, and the speed detection method further comprises a step of:
judging, based on the speed direction information, whether reverse running occurs, and judging, based on the speed magnitude information, whether speed anomaly occurs.

25. The speed detection method of claim 21, wherein the sequence frames comprises first sequence frames acquired by the imaging sensor and second sequence frames acquired by the depth sensing sensor; and the optical flow method calculation step, the shift conversion step, the time quantity determination step, and the speed information calculation step all perform processing for the first sequence frames and the second sequence frames respectively to obtain first speed information and second speed information separately.

26. The speed detection method of claim 14, wherein if the sequence frames are acquired through sensing by the imaging sensor, in the optical flow method calculation step, an optical flow field used for calculation of the optical flow method reflects a variation trend of brightness and/or chromaticity of each pixel on the frame.

27. The speed detection method of claim 14, wherein if the sequence frames are acquired through sensing by the depth sensing sensor, in the optical flow method calculation step, an optical flow field used for calculation of the optical flow method reflects a variation trend of depth of each occupancy grid on the frame.

28. The speed detection method of claim 14, wherein in the speed information calculation step, smoothing filter processing is performed on multiple pieces of speed information corresponding to the sequence frames, and speed information left after filtering is combined to form the speed information of the sequence frames.

29. A passenger conveying system, comprising a passenger conveyor and the speed detection system of claim 1.

* * * * *